(12) United States Patent
Swinderman et al.

(10) Patent No.: US 8,573,384 B2
(45) Date of Patent: Nov. 5, 2013

(54) BULK MATERIAL CONVEYOR BELT SCRAPER HAVING A DUST SKIRT AND METHOD OF USING THE SAME

(75) Inventors: Robert Todd Swinderman, Palm Coast, FL (US); Joerg Gauss, Oestrich-Winkel (DE); Oleg Meister, Walluf (DE)

(73) Assignee: Martin Engineering Company, Neponset, IL (US)

( * ) Notice: Subject to any disclaimer, the term of this patent is extended or adjusted under 35 U.S.C. 154(b) by 222 days.

(21) Appl. No.: 13/053,782

(22) Filed: Mar. 22, 2011

(65) Prior Publication Data
US 2012/0241288 A1   Sep. 27, 2012

(51) Int. Cl.
*B65G 45/12* (2006.01)
*B65G 45/16* (2006.01)

(52) U.S. Cl.
USPC .......................................... 198/497; 198/499

(58) Field of Classification Search
USPC .................................................. 198/497, 499
See application file for complete search history.

(56) References Cited

U.S. PATENT DOCUMENTS

| 4,290,520 A | * | 9/1981 | Rhodes | 198/499 |
|---|---|---|---|---|
| 5,011,002 A | * | 4/1991 | Gibbs | 198/497 |
| 5,213,197 A | * | 5/1993 | Mohri | 198/499 |
| 5,339,947 A | * | 8/1994 | Campanile | 198/499 |
| 6,354,428 B1 | * | 3/2002 | Gibbs et al. | 198/497 |
| 2001/0054539 A1 | | 12/2001 | Swinderman | |
| 2003/0116405 A1 | * | 6/2003 | Stoll | 198/497 |
| 2006/0108200 A1 | | 5/2006 | Peterson et al. | |
| 2006/0131136 A1 | * | 6/2006 | Smith et al. | 198/499 |
| 2006/0225990 A1 | | 10/2006 | Yoshizako et al. | |
| 2007/0089968 A1 | * | 4/2007 | Swinderman | 198/497 |
| 2008/0017479 A1 | * | 1/2008 | Ostman | 198/497 |
| 2008/0179168 A1 | * | 7/2008 | Swinderman | 198/499 |

OTHER PUBLICATIONS

Benetech Max Clean BXP2 Primary Belt Cleaner, Product Brochure, Benetech, Inc., 2011, 2 pages.

* cited by examiner

*Primary Examiner* — Gene Crawford
*Assistant Examiner* — Matthew Marotta
(74) *Attorney, Agent, or Firm* — Thompson Coburn LLP; Clyde L. Smith (57) ABSTRACT

An improved bulk material conveyor belt scraper comprises a skirt that shields mounting surfaces from the bulk material dust. By shielding the mounting surfaces from bulk material dust, such dust does not interfere with the replacement of the scraper blade. The belt scraper also comprises an improved securing mechanism for attaching belt scrapers to belt scraper mounts. The improved securing mechanism comprises pegs that have an elongate transverse cross-section that more evenly distributes bearing loads between the belt scrapers and their respective mounts. This eliminates local yielding that can cause belt scrapers to become loose over time.

12 Claims, 6 Drawing Sheets

BULK MATERIAL CONVEYOR BELT SCRAPER HAVING A DUST SKIRT AND METHOD OF USING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to bulk material conveyor belt assemblies. More specifically, this invention pertains to a conveyor belt scraper comprising a skirt that prevents bulk material that is removed from the conveyor belt by the belt scraper from migrating to mating surfaces between the belt scraper and the mounting member that holds the scraper blade. By preventing bulk material removed from the conveyor belt from migrating to the mating surfaces between the belt scraper and the mounting member, such material does not interfere with the replacement of worn belt scrapers. The belt scraper assembly also utilizes securing pegs that have an elongate transverse cross-section that distribute bearing loads more evenly than would securing pegs having circular transverse cross-sections.

2. General Background

Bulk material conveyor belt systems often comprise belt scraper assemblies that are configured to remove bulk material carryback from the belt. Due to the function they serve, belt scrapers necessarily become covered with dust and fine particles removed from the conveyor belt. This is especially the case on the leading side of a belt scraper, since the leading side is the side that engages and redirects the bulk material removed from the conveyor belt. Unfortunately, the dust and fine particles can make the task of replacing worn belt scrapers difficult since the dust and fine particles often interfere with mating surfaces between the belt scrapers and the mounts that hold the belt scrapers. For example, belt scrapers are often formed of polymeric material, which can make it difficult to rigidly attach such belt scrapers to belt scraper mounts. As such, in some cases, the belt scraper comprises a tapered mounting portion that mates with, and is inserted into, a correspondingly tapered rigid pocket of the mount that supports the belt scraper. This provides the belt scraper with good fixation relative to the mount. However, during use, dust from the bulk material scraped from the conveyor belt can work its way into the pocket of the mount. While this doesn't necessarily interfere with the operation of the belt scraper, it does make it difficult to replace the belt scraper when worn and, more particularly, to attach a replacement belt scraper to the mount.

SUMMARY OF THE INVENTION

The present invention helps prevent bulk material dust removed from the conveyor belt from interfering with the process of replacing worn belt scrapers. The invention is achieved by providing a belt scraper with a skirt that shields mounting surfaces from the bulk material dust. The invention also pertains to an improved securing mechanism for attaching belt scrapers to belt scraper mounts. The improved securing mechanism more evenly distributes bearing loads between the belt scrapers and their respective mounts. This eliminates local yielding that can cause belt scrapers to become loose over time.

In a first aspect of the invention, a bulk material conveyor belt scraper has a leading side and a trailing side and comprising a scraper portion, a mounting portion, and a skirt portion. The scraper portion has a scraping edge that lies on the leading side of the belt scraper. The scraping edge is configured and adapted to engage a moving conveyor belt in a manner such that the scraper portion removes bulk material from the conveyor belt, with the leading side of the belt scraper leading the trailing side relative to the movement of the belt. The mounting portion of the belt scraper is integrally formed with the scraper portion as a monolithic part. The mounting portion is opposite the scraper portion and protrudes therefrom in a manner such that the mounting portion tapers in a narrowing manner as it extends away from the scraper portion. The skirt portion is integrally formed with the scraper portion and the mounting portion as a portion of the monolithic part, and forms a portion of the leading side of the belt scraper. The skirt portion protrudes from the scraper portion and is adjacent to and spaced from the mounting portion in a manner such that the skirt portion lies between the mounting portion and the leading side of the belt scraper and such that a slot extends through the belt scraper parallel to the scraping edge.

In another aspect of the invention, a method comprises operating a bulk material conveyor belt system. The conveyor belt system comprises a belt moving in an endless loop. The method includes engaging the belt with a belt scraper assembly in a manner removing material from the conveyor belt. The belt scraper assembly comprises a belt scraper and a mounting member. The belt scraper has a leading side and a trailing side. The belt scraper is in contact with the belt in a manner such that there is relative movement therebetween with the leading side of the belt scraper leading the trailing side. The belt scraper also comprises a scraper portion, a mounting portion, and a skirt portion. The scraper portion is engaged with the belt. The mounting portion is integrally formed with the scraper portion as a monolithic part and protrudes from the scraper portion. The skirt portion is integrally formed with the scraper portion and the mounting portion as a portion of the monolithic part and forms a portion of the leading side of the belt scraper. The skirt portion protrudes from the scraper portion and is adjacent to and spaced from the mounting portion in a manner such that the skirt portion lies between the mounting portion and the leading side of the belt scraper. The mounting member comprises a pocket. The mounting portion of the belt scraper is positioned in the pocket of the mounting member. The skirt portion is outside of and adjacent the pocket, and shields the pocket in a manner preventing at least some the material from entering the pocket.

Further features and advantages of the present invention, as well as the operation of the invention, are described in detail below with reference to the accompanying drawings.

Reference numerals in the written specification and in the drawing figures indicate corresponding items.

DETAILED DESCRIPTION

A belt scraper assembly 10 in accordance with the invention is shown in FIGS. 1-4. The belt scraper assembly 10 comprises a belt scraper 12, a mounting member 14, and two securing pegs 16.

The belt scraper 12 itself has a leading side 18 and a trailing side 20 and is preferably symmetric about a plane. The leading side 18 of the belt scraper 12 is preferably convex. The trailing side 20 is preferably concave. The belt scraper 12 comprises a scraper portion 22, a mounting portion 24 and a skirt portion 26. The scraper portion 22, the mounting portion 24, and the skirt portion 26 are preferably formed as a monolithic integral part of polymeric material. The scraper portion 22 comprises a scraping edge 28 on the leading side 18 of the belt scraper 12 that is configured and adapted to engage a moving conveyor belt.

Figure 1:
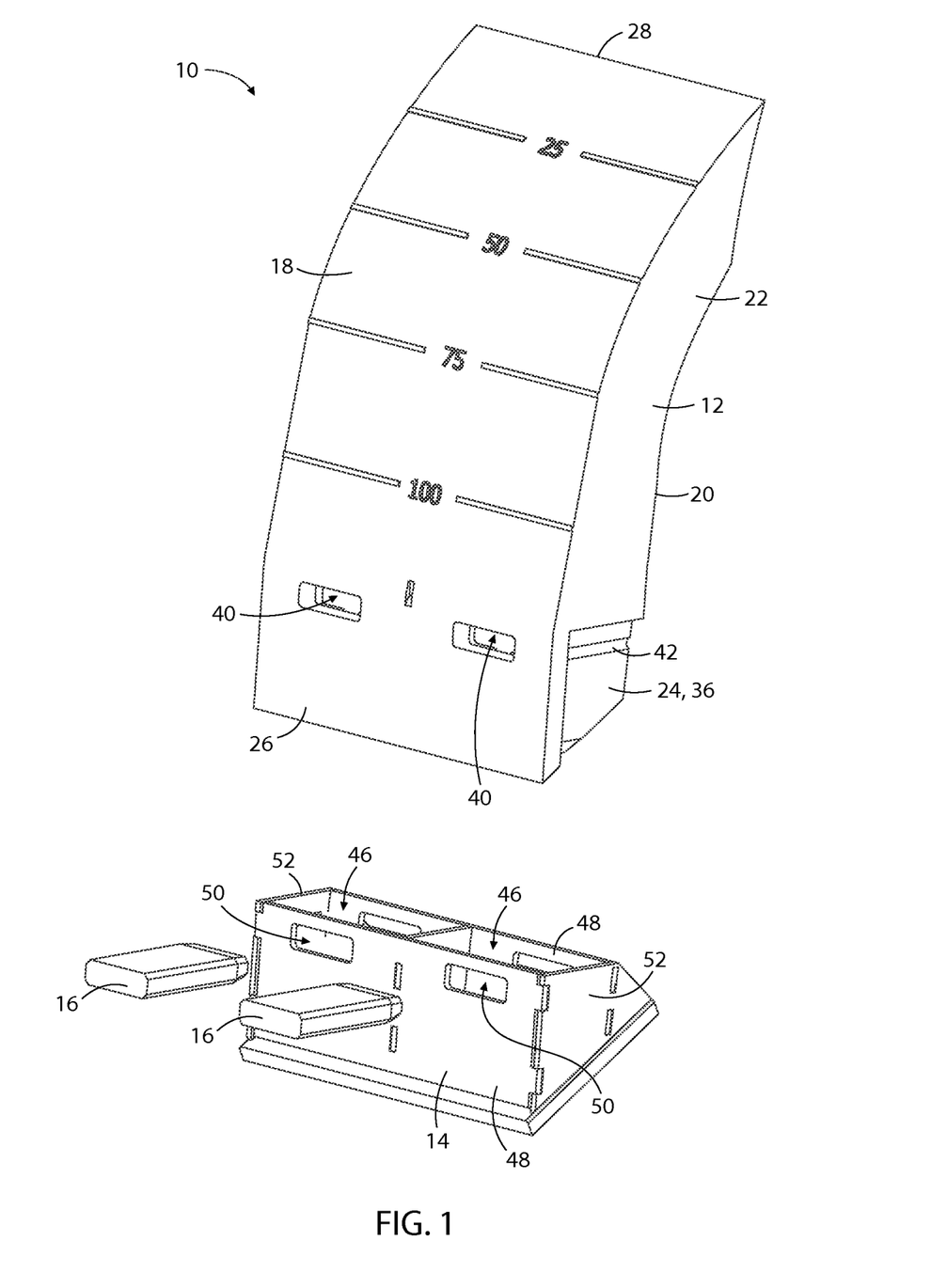
FIG. 1 depicts an exploded perspective view of a belt scraper assembly in accordance with the invention.
Figure 2:
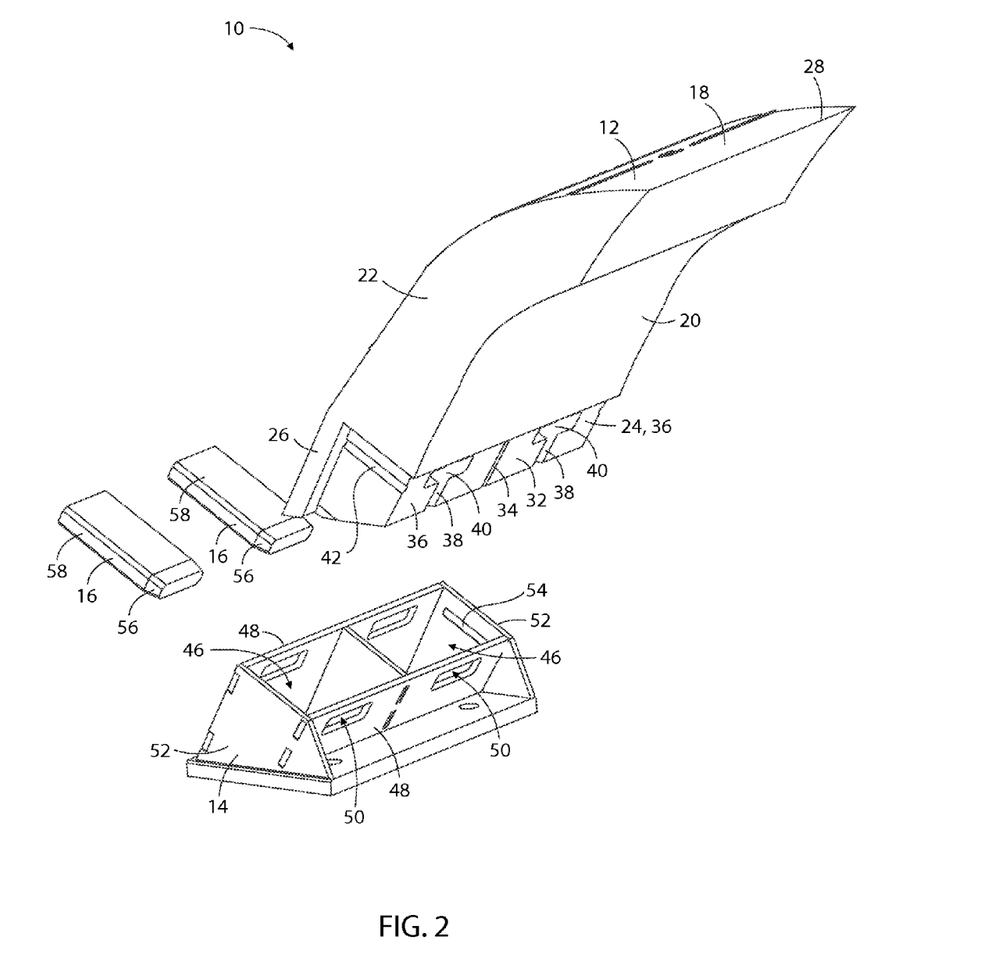
FIG. 2 depicts another exploded perspective view of the belt scraper assembly shown in FIG. 1.
Figures 3, 4:
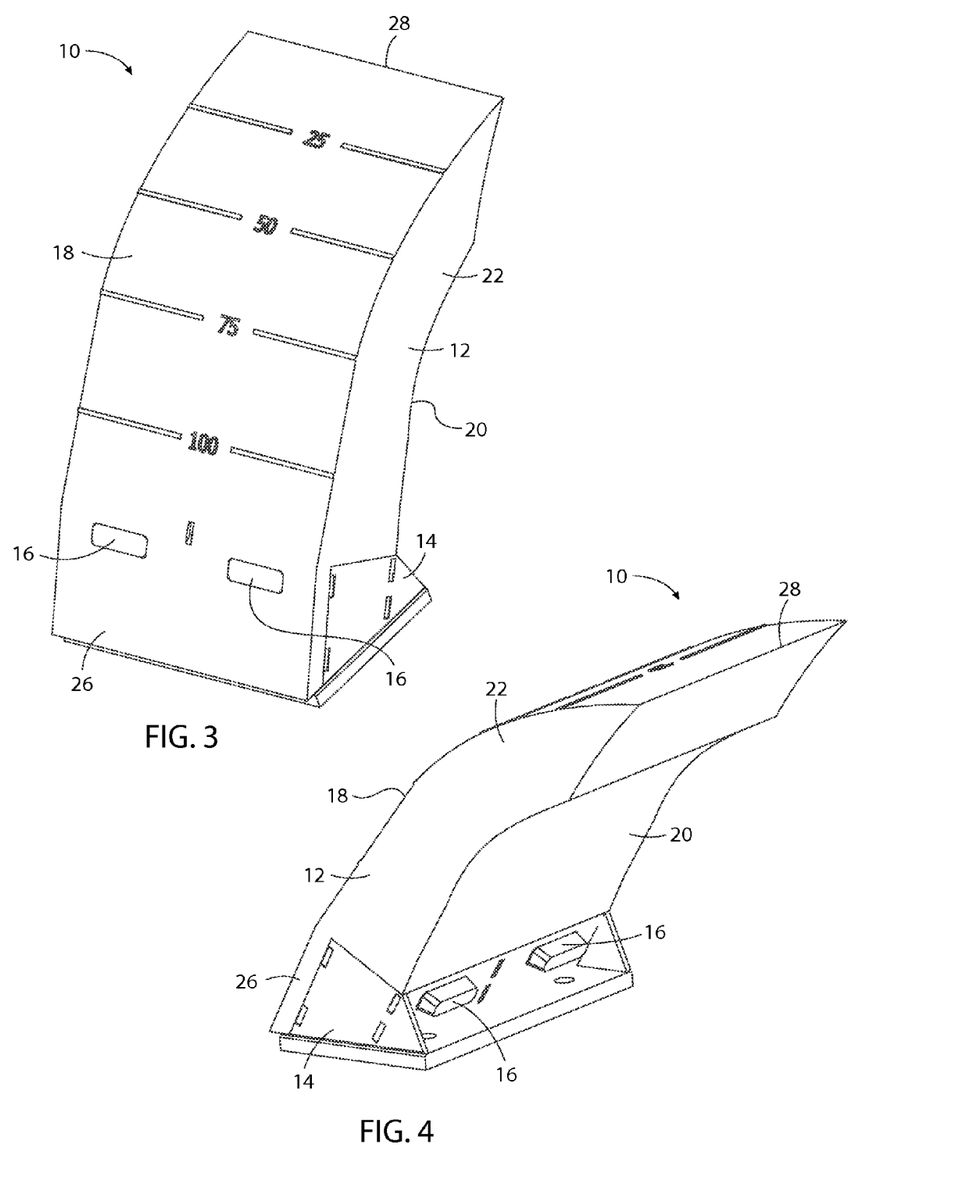
FIG. 3 is a perspective view of the belt scraper assembly shown in FIGS. 1 and 2 and is shown with the components assembled to each other.
FIG. 4 is another perspective view of the belt scraper assembly from a different point of view.
Figure 5:
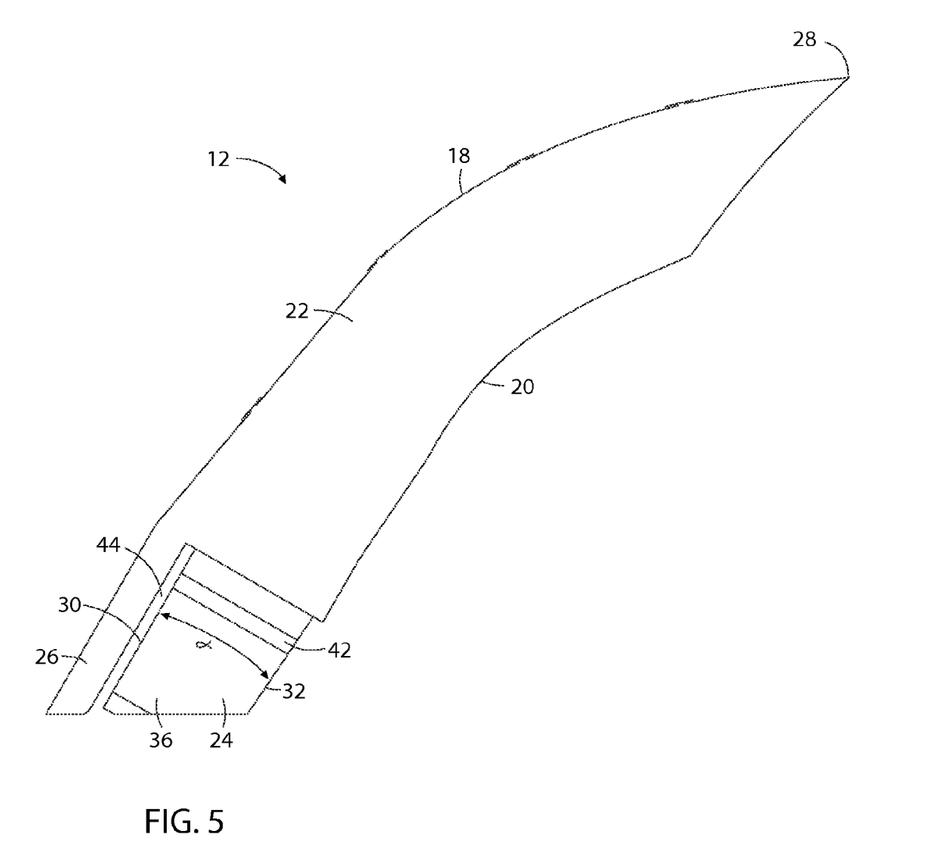
FIG. 5 is a side view of the belt scraper by itself.
Figure 6:
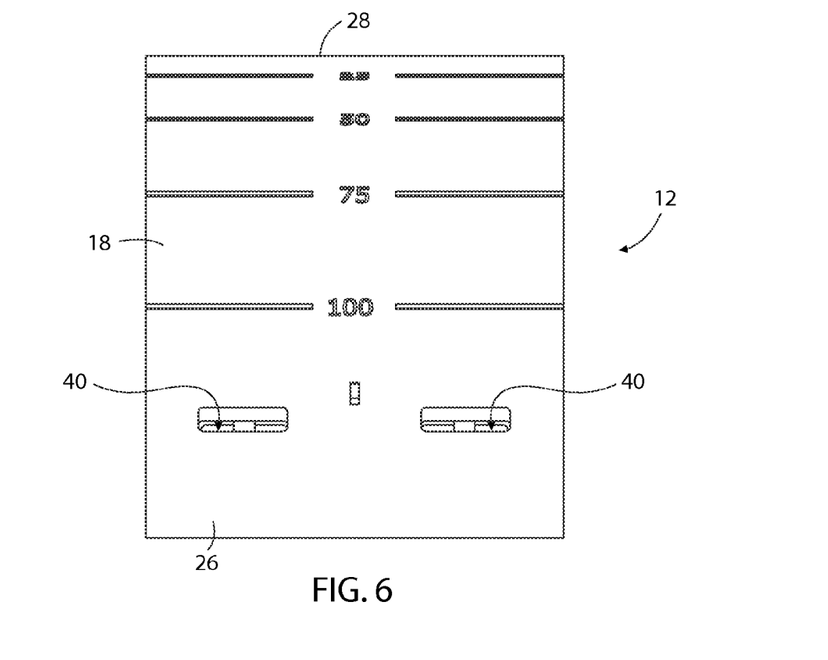
FIG. 6 is an elevation view of the leading side of the belt scraper.
Figure 7:
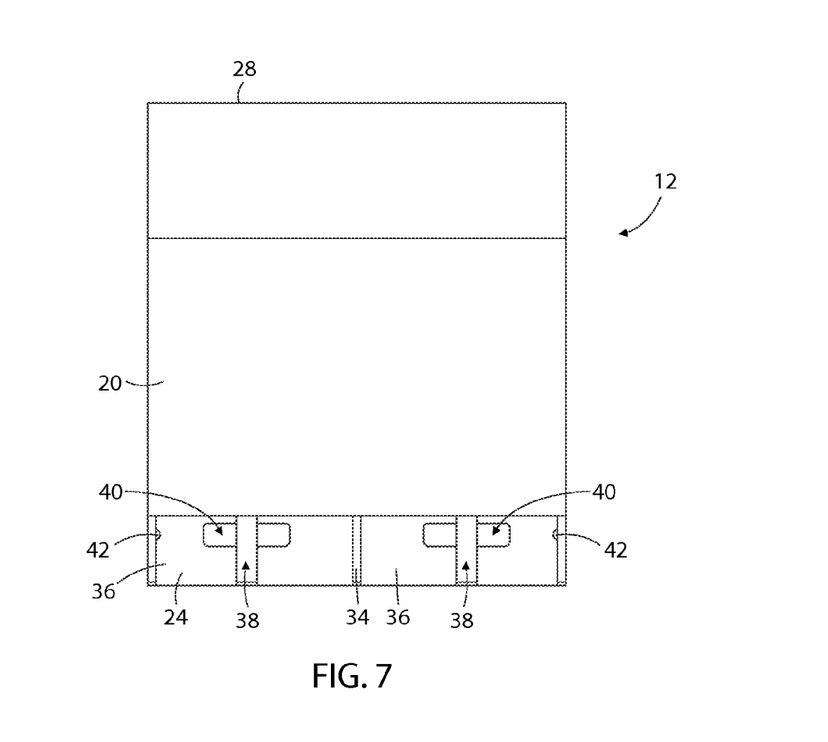
FIG. 7 is an elevation view of the trailing side of the belt scraper.
Figure 8:
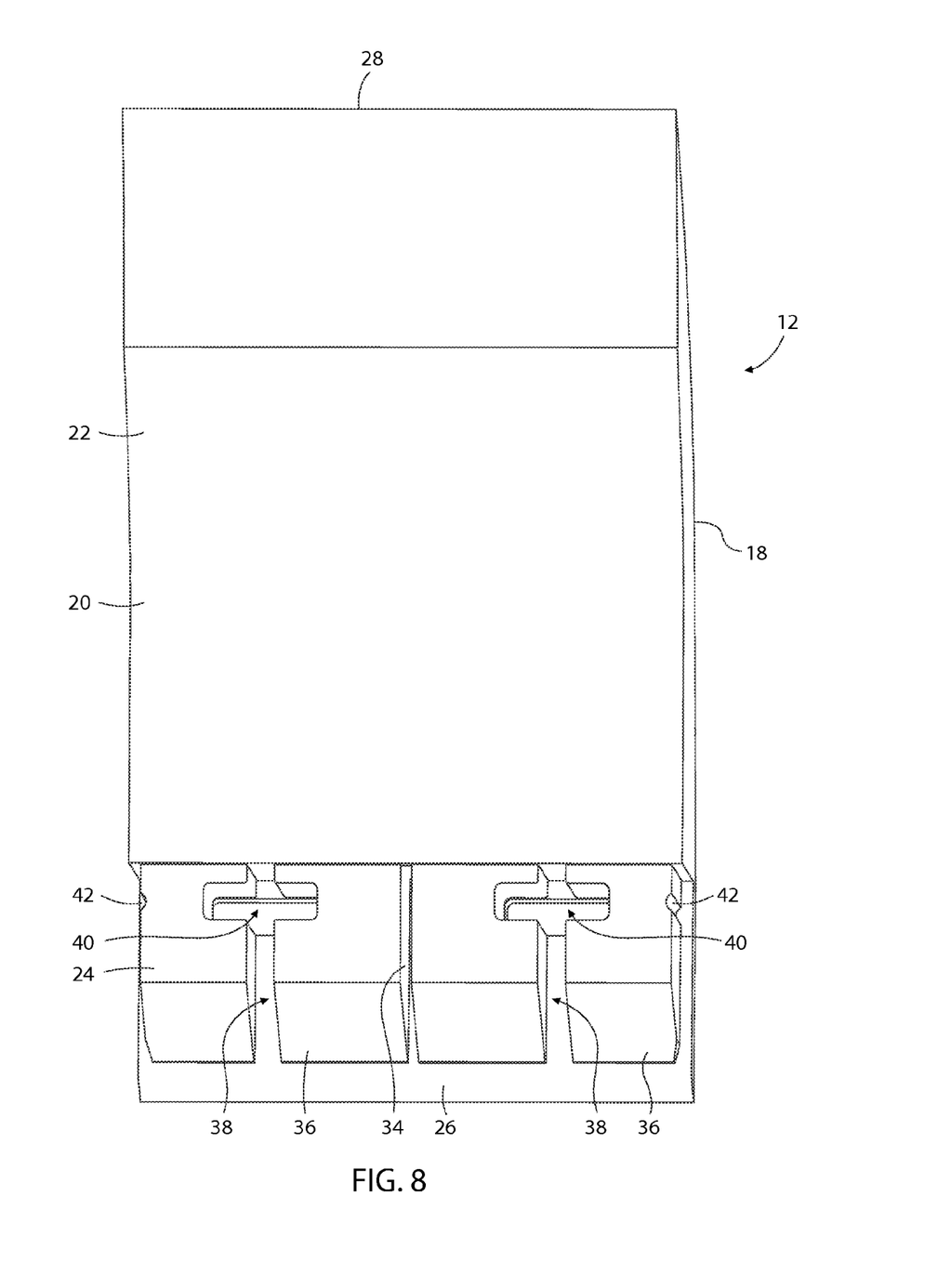
FIG. 8 is a perspective view of the belt scraper.

The mounting portion 24 of the belt scraper 12 protrudes from the scraper portion 22 and tapers in a narrowing manner as it extends away from the scraper portion. This tapering aspect of the mounting portion 24 is most notable in FIG. 5 and is shown as the angle α (α being greater than zero) between the front face 30 and the rear face 32 of the mounting portion. The mounting portion 24 comprises a primary slot 34 that is parallel to and centered about the plane of symmetry of the belt scraper 12. The primary slot 34 divides and separates the mounting portion 24 into two mounting protrusions 36 that are mirror images of each other. Each of the mounting protrusions 36 comprises a relief slot 38 and a peg opening 40. Each of the peg openings 40 has an elongate transverse cross-section (i.e. the cross-section perpendicular to its longitudinal direction) oriented with its larger dimension perpendicular to the plane of symmetry of the belt scraper 12. The peg openings 40 extend completely through the mounting portion 24 of the belt scraper 12. Each relief slot 38 bisects its respective mounting protrusion 36 and intersects the respective peg opening 40. The relief slots 38 are parallel to the plane of symmetry of the belt scraper 12. The mounting portion 24 of the belt scraper 12 further comprises guide notches 42 that serve as visual and tactile guides when the belt scraper is being inserted into the mounting member 14 of the belt scraper assembly 10 (discussed below).

The skirt portion 26 of the belt scraper 12 forms a portion of the leading side 18 of the belt scraper and extends from the scraper portion 22. The skirt portion 26 is adjacent to and spaced from the mounting portion 24 in a manner such that a slot 44 is formed between the skirt portion and the mounting portion. The peg openings 40 that extend through the mounting portion 24 also extend through the skirt portion 26 of the belt scraper 12.

The mounting member 14 is configured and adapted to receive the mounting portion 24 of the belt scraper 12. The mounting member 14 is preferably formed of metal and comprises two pockets 46, with each being adapted to receive one of the mounting protrusions 36 of the mounting portion 24 of the belt scraper 12. Similar to the mounting portion 24 of the belt scraper 12, each pocket 46 of the mounting member 14 tapers in a narrowing manner as it extends into the mounting member. The longitudinal walls 48 of the mounting member 14 comprise two peg openings 50, with each extending into a respective one of the pockets 46. The lateral walls 52 of the mounting member 14 comprise guide protrusions 54 that protrude slightly into the pockets 46.

The securing pegs 16 each comprise a tapered lead-in section 56 and a main body portion 58. The main body portion 58 of each securing peg 16 preferably has an elongate transverse cross-section that is slightly larger than the transverse cross-section of the peg openings 40 of the belt scraper 12. The main body portion 58 of each securing peg 16 also preferably has length sufficient to extend through both of the longitudinal walls 48 of the mounting member 14.

The belt scraper assembly 10 is assembled by inserting the mounting protrusions 36 of the belt scraper 12 into the pockets 46 of the mounting member 14. The tapered nature of the mounting protrusions 36 and of the pockets 46 ensures that the two parts rigidly engage each other when they are assembled to each other. As the mounting protrusions 36 are being inserted into the pockets 46 of the mounting member 14, the guide protrusions 54 on the lateral walls 52 of the mounting member push inward on the mounting protrusions 36. The relief slots 38 of the mounting portion 24 of the belt scraper 12 allow the mounting protrusions 36 to resiliently deform as this occurs. Once the mounting protrusions 36 of the belt scraper 12 are fully seated in the pockets 46 of the mounting member 14, the guide notches 42 of the belt scraper become aligned with the guide protrusions 54 of the mounting member. This provides tactile confirmation that the parts are fully engaged with each other. To prevent the belt scraper 12 from being dislodged from the mounting member 14, the securing pegs 16 are inserted through the peg openings 40 of the belt scraper and through the peg openings 50 of the mounting member. The lead-in portions 56 of the securing pegs 16 facilitate initial alignment of the pegs with the openings. The securing pegs 16 have a slight interference fit in the peg openings 40 of the belt scraper 12 and therefore must be forcibly driven into or out of the belt scrapers 12. This prevents the securing pegs 16 from inadvertently separating from the belt scraper assembly 10. As assembled, the skirt portion 26 of the belt scraper 12 covers the exterior of one of the longitudinal walls 48 of the mounting member 14, and that longitudinal wall extends into the slot 44 that is formed between the skirt portion and the mounting portion 24 of the belt scraper.

Once assembled as described above, the belt scraper assembly 10 can be brought into contact with a moving conveyor belt for the purpose of removing bulk material from the conveyor belt. As this is done, the scraping edge 28 of the scraper portion 22 of the belt scraper 12 engages the conveyor belt and bulk material is forced onto the leading side 18 of the belt scraper 12. It should be appreciated that the skirt portion 26 of the belt scraper 12 protects and shields the pockets 46 of the mounting member 14. As such, bulk material is not able to migrate from the leading side 18 of the belt scraper 12 into the pockets 46 of the mounting member 14. This prevents the bulk material from interfering with the replacement of the belt scraper 12 after its useful life is exhausted. It should also be appreciated that the elongate transverse cross-sections of the securing pegs 16 and peg openings 40, 50, is configured to distribute pull-out bearing loads evenly across the width of the pegs and openings. This is an improvement over the use of securing pegs and peg openings having circular transverse cross-sections, which tend to focus bearing loads over small portions of the bearing surfaces. Thus, the elongated transverse cross-sections of the securing pegs 16 and peg openings 40, 50 helps prevent the peg openings 40 of the belt scraper 12 from yielding during the useful life of the belt scraper.

In view of the foregoing, it should be appreciated that the invention achieves the several advantages over prior art conveyor belt scrapers and belt scraper assemblies.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed unless such order is necessary.

What is claimed is:

1. A bulk material conveyor belt scraper assembly comprising:
    a belt scraper having a leading side and a trailing side, the belt scraper comprising a scraper portion, a mounting portion, a skirt portion, and a first hole, the scraper portion having a scraping edge that lies on the leading side of the belt scraper, the scraping edge being configured and adapted to engage a moving conveyor belt in a manner such that the scraper portion removes bulk material from the conveyor belt with the leading side of the belt scraper leading the trailing side, the mounting portion being integrally formed with the scraper portion as a monolithic part, the mounting portion protruding from the scraper portion opposite the scraping edge, the mounting portion tapering in a narrowing manner as it extends away from the scraper portion, the skirt portion being integrally formed with the scraper portion and the mounting portion as a portion of the monolithic part and forming a portion of the leading side of the belt scraper, the skirt portion protruding from the scraper portion and being adjacent to and spaced from the mounting portion in a manner such that the skirt portion lies between the mounting portion and the leading side of the belt scraper and such that a slot extends at least partially through the belt scraper parallel to the scraping edge, the first hole extending through the skirt portion and the mounting portion;
    a mounting member comprising a tapered pocket and a second hole, the tapered pocket bound by four wall portions, the mounting portion of the belt scraper being positioned in the tapered pocket of the mounting member with a first one of the walls of the mounting member lying between the mounting portion of the belt scraper and the skirt portion of the belt scraper; the second hole extending through the first wall and an opposite second one of the walls;
    a securing pin, the securing pin extending within the first and second holes in a manner such that the securing pin is positioned within the skirt of the belt scraper, through the first wall of the mounting member, through the mounting portion of the belt scraper, and within the second wall of the mounting member.

2. The bulk material conveyor belt scraper assembly of claim 1 wherein the first hole has an elongate transverse cross-section and the securing pin has an elongate transverse cross-section.

3. The bulk material conveyor belt scraper assembly of claim 2 wherein the belt scraper is symmetric about a plane of symmetry, the transverse cross-section of the first hole has a longest dimension that is oriented perpendicular to the plane of symmetry, and the transverse cross-section of the securing pin has a longest dimension that is oriented perpendicular to the plane of symmetry.

4. The bulk material conveyor belt scraper assembly of claim 1 wherein the mounting portion of the belt scraper comprises a guide, a third one of the walls of the mounting member comprises a guide that is interlocked with the guide of the mounting portion of the belt scraper.

5. The bulk material conveyor belt scraper assembly of claim 4 wherein the first hole has an elongate transverse cross-section and the securing pin has an elongate transverse cross-section.

6. The bulk material conveyor belt scraper assembly of claim 5 wherein the belt scraper is symmetric about a plane of symmetry, the transverse cross-section of the first hole has a longest dimension that is oriented perpendicular to the plane of symmetry, and the transverse cross-section of the securing pin has a longest dimension that is oriented perpendicular to the plane of symmetry.

7. A method comprising:
    operating a bulk material conveyor belt system, the conveyor belt system comprising a belt moving in an endless loop;
    engaging the belt with a belt scraper assembly in a manner removing material from the conveyor belt, the belt scraper assembly comprising a belt scraper, a mounting member, a securing pin, the belt scraper having a leading side and a trailing side, the belt scraper being in contact with the belt in a manner such that there is relative movement therebetween with the leading side of the belt scraper leading the trailing side, the belt scraper comprising a scraper portion, a mounting portion, and a skirt portion, the scraper portion being engaged with the belt, the mounting portion being integrally formed with the scraper portion as a monolithic part, the mounting portion protruding from the scraper portion, the skirt portion being integrally formed with the scraper portion and the mounting portion as a portion of the monolithic part and forming a portion of the leading side of the belt scraper, the skirt portion protruding from the scraper portion and being adjacent to and spaced from the mounting portion in a manner such that the skirt portion lies between the mounting portion and the leading side of the belt scraper, the mounting member comprising a pocket that is bound by four wall portions, the mounting portion of the belt scraper being positioned in the pocket of the mounting member with a first one of the walls of the mounting member lying between the mounting portion of the belt scraper and the skirt portion of the belt scraper, the securing pin extending within the skirt of the belt scraper, through the first wall of the mounting member, through the mounting portion of the belt scraper, and within an opposite second wall of the mounting member.

8. The method of claim 7 wherein a first hole has an elongate transverse cross-section and the securing pin has an elongate transverse cross-section.

9. The method of claim 8 wherein the belt scraper is symmetric about a plane of symmetry, the transverse cross-section of the first hole has a longest dimension that is oriented perpendicular to the plane of symmetry, and the transverse cross-section of the securing pin has a longest dimension that is oriented perpendicular to the plane of symmetry.

10. The method of claim 7 wherein the mounting portion of the belt scraper comprises a guide, a third one of the walls of the mounting member comprises a guide that is interlocked with the guide of the mounting portion of the belt scraper.

11. The method of claim 10 wherein a first hole has an elongate transverse cross-section and the securing pin has an elongate transverse cross-section.

12. The method of claim 11 wherein the belt scraper is symmetric about a plane of symmetry, the transverse cross-section of the first hole has a longest dimension that is oriented perpendicular to the plane of symmetry, and the transverse cross-section of the securing pin has a longest dimension that is oriented perpendicular to the plane of symmetry.

\* \* \* \* \*